Patented Aug. 28, 1923.

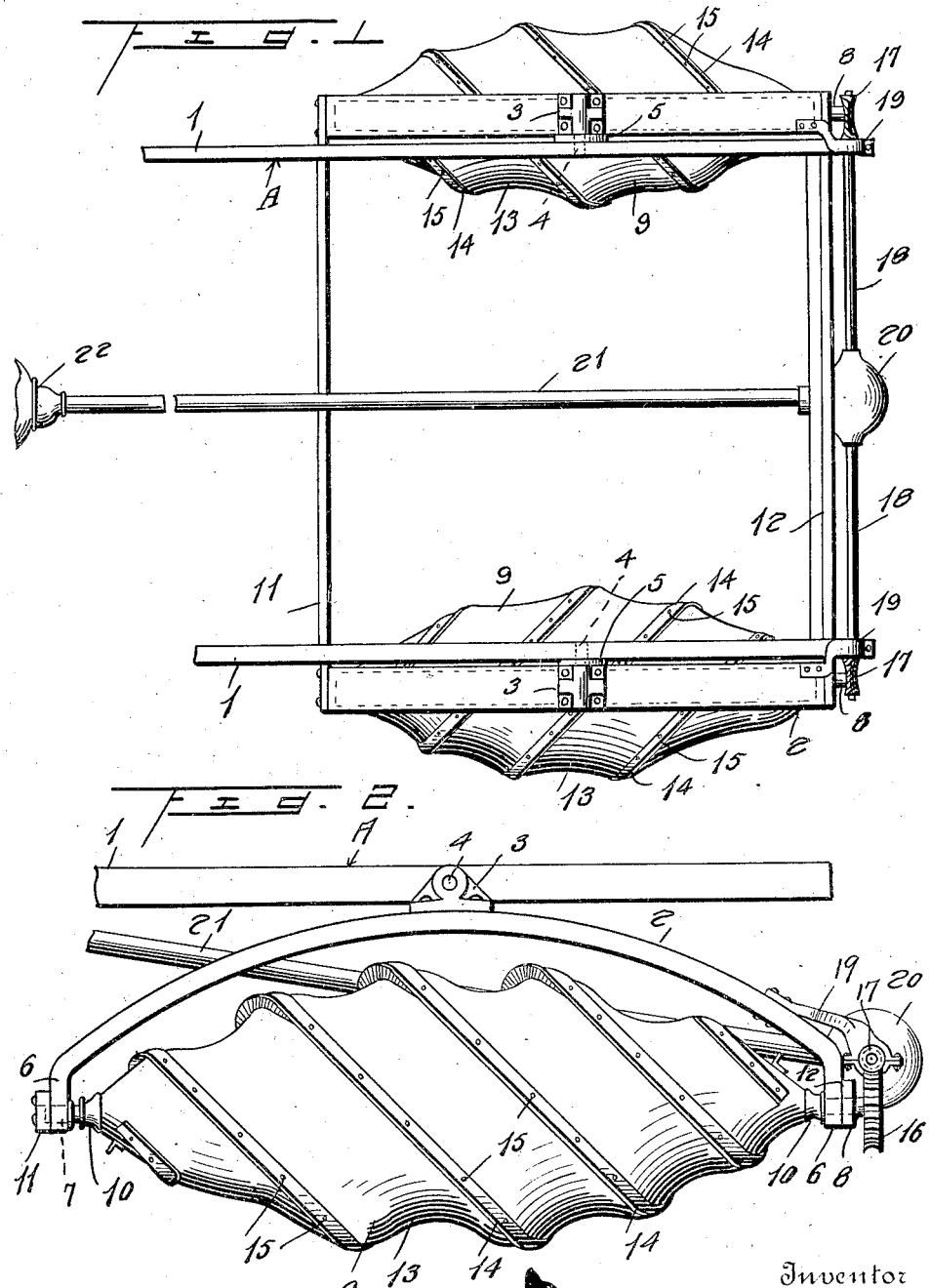

1,466,546

UNITED STATES PATENT OFFICE.

ANDREW J. PIDGEON, OF ST. FERDINAND OF HALIFAX, QUEBEC, CANADA.

AUTOMOBILE SLEIGH.

Application filed September 18, 1918, Serial No. 254,632. Renewed January 18, 1923.

*To all whom it may concern:*

Be it known that I, ANDREW J. PIDGEON, a subject of the King of Great Britain, residing at St. Ferdinand of Halifax, in the county of Megantic, in the Province of Quebec and Dominion of Canada, have invented certain new and useful Improvements in Automobile Sleighs; and I do hereby declare the following to be a full, clear, and exact description of the invention, such as will enable others skilled in the art to which it appertains to make and use the same.

This invention relates to automobile sleighs, and more particularly to means whereby an automobile or similar vehicle may be readily converted into a sleigh for winter use.

One of the main objects of the invention is to provide simple and efficient propelling means which may be readily applied to an automobile of standard construction especially adapted for gripping snow or icy surfaces so as to propel the vehicle thereover.

A further object is to provide propelling elements which may be applied at the rear portion of the vehicle by the simple expedient of removing the rear wheels and associated parts.

Another object is to provide propelling members which are especially adapted for use in snow, and may be equally well used upon ice or a similar relatively hard traction surface.

Further objects will appear from the detailed description.

In the drawing:

Figure 1 is a top plan view of the rear portion of a vehicle frame with a propelling mechanism constructed in accordance with my invention as applied.

Figure 2 is a side view of the same.

The vehicle frame designated generally by A may be of any suitable or standard construction and is provided with the side beams or sills 1 of channel construction. In applying my invention, the rear wheels and associated parts are removed from the frame, and are replaced by downwardly directed bow frames 2 of channel construction, each of which is provided, at its longitudinal center, with a bearing block 3 secured to the upper face thereof and receiving a stub shaft 4 which is secured in sill 1 and projects outwardly therefrom. The bow frames 2 are spaced from the sills 1 so as to permit free rocking movement thereof, suitable wear plates or washers 5 being interposed between the frames and sills.

Each of the bow frames 2 is provided, at each end, with an integral vertically directed arm 6. These arms are apertured to provide bearing members for stub shafts 7 and 8 formed at the forward and rearward ends, respectively, of a substantially ellipsoidal body or drum 9 which is thus rotatably supported in the frame 2. Suitable bearing cups 10 are positioned between the arms 6 and the ends of body or drum 9, these cups being adapted to contain anti-friction bearings mounted therein so as to reduce friction to a minimum. Suitable brace bars 11 and 12 extend transversely of the vehicle frame A and are secured to the forward and rearward ends, respectively, of the bow frames 2 forming therewith a substantially rectangular frame of rigid construction and serving to prevent relative movement between the drums 9 transversely of the vehicle frame. In this manner, the drums 9 are mounted so as to be rockable about a horizontal axis while being maintained in proper relation to the sills 1.

Each of the drums 9 is provided with a relatively wide helical groove 13 extending the full length thereof, the grooves on the drums being relatively reversed. This groove forms, in effect, a relatively wide rounded helical rib or thread 14 extending the full length of the drum. These rounded relatively wide or thick threads are well adapted to grip snow and similar relatively soft material so as to propel the vehicle when the drums are rotated. As the drums 9 are comparatively large, and the gripping threads 14 thereof are rounded and relatively broad, these drums are well adapted for gripping soft materials so as to impart a forward impulse to the vehicle when the drums are rotated. Each drum is further provided with a length or strip of steel of angle iron construction which is secured about the drum at the apex of thread 14, said strip serving to provide a supplemental relatively sharp thread 15 which is well adapted for gripping ice and similar hard surfaces. In this manner, the drum is provided with two bearing surfaces, one well adapted for use in connection with snow and similar soft materials, the other being specially adapted for gripping a hard traction surface so as to propel the vehicle, and these surfaces are so related as to eliminate interference between the same when the drums are in use.

The stub shaft 8 of each of the drums 9 propjects rearwardly through its supporting arm 6 of the bow frame 2, and has a worm wheel 16 secured thereon. This worm wheel meshes with a worm 17 secured on a drive shaft 18 which is rotatably supported in hangers 19 depending from the frame 2. The shaft 18 is formed of two sections, in the well known manner, and extends into a differential casing 20 into which also extends a transmission shaft 21 which may be connected by a universal joint, as indicated at 22, to the drive shaft of the engine of the automobile. Tranmission shaft 21 is, of course, operatively connected to the two sections of shaft 18 by differential gearing in the well known manner so that, when the shaft is rotated, rotation will be imparted to the sections of shaft 18 which serves, through the medium of worm 17 and worm wheel 16, to cause simultaneous and opposite rotation of the drums 9. The universal joint 22 permits the shafts 18 to freely move up and down with the drum. When the drums are thus rotated, the threads thereof will act to propel the vehicle, as above stated. In this connection, it is to be noted that the relatively sharp surfaces 15, in addition to serving as means for gripping relatively hard traction surfaces, also provides a cutting member for the relatively broad surface 14 in the event that materials are encountered which are moderately hard but not of sufficient hardness to prevent sinking thereinto of the drums 9.

It will be evident that there may be slight changes made in the construction and arrangement of the different parts of my invention without departing from the field and scope of the same, and I intend to include all such variations, as fall within the scope of the appended claims, in this application in which a preferred form only of my invention is disclosed.

What I claim is:

An automobile sleigh including a chassis and a driving medium, bowed shaped members having their central portions pivoted to the chassis and having their ends bent and disposed vertically, stub shafts journaled in the ends of said members, ground engaging elements secured to said stub shafts, means connecting said bowed shaped members to cause them to move in unison, rearwardly extending brackets secured to the rear ends of the bowed shaped members and projecting beyond the rear end of the chassis, shafts journaled to said brackets and extending transversely of the chassis and located rearwardly thereof, worm gearing connecting the outer ends of the second shafts to the rear ends of the rear stub shafts, and means connecting the inner ends of the second shaft to the driving medium.

In testimony whereof I affix my signature in presence of two witnesses.

ANDREW J. PIDGEON

Witnesses:
  R. D. LAFLEUR,
  J. P. A. ST. PIERRE.